March 7, 1939. R. A. FORESMAN 2,149,392
FLOW CONTROL APPARATUS FOR GASEOUS MEDIA
Filed June 10, 1936 3 Sheets-Sheet 1

WITNESSES:
James K Mosser
E. Lutz

INVENTOR
ROBERT A. FORESMAN.
BY
A. B. Purves
ATTORNEY

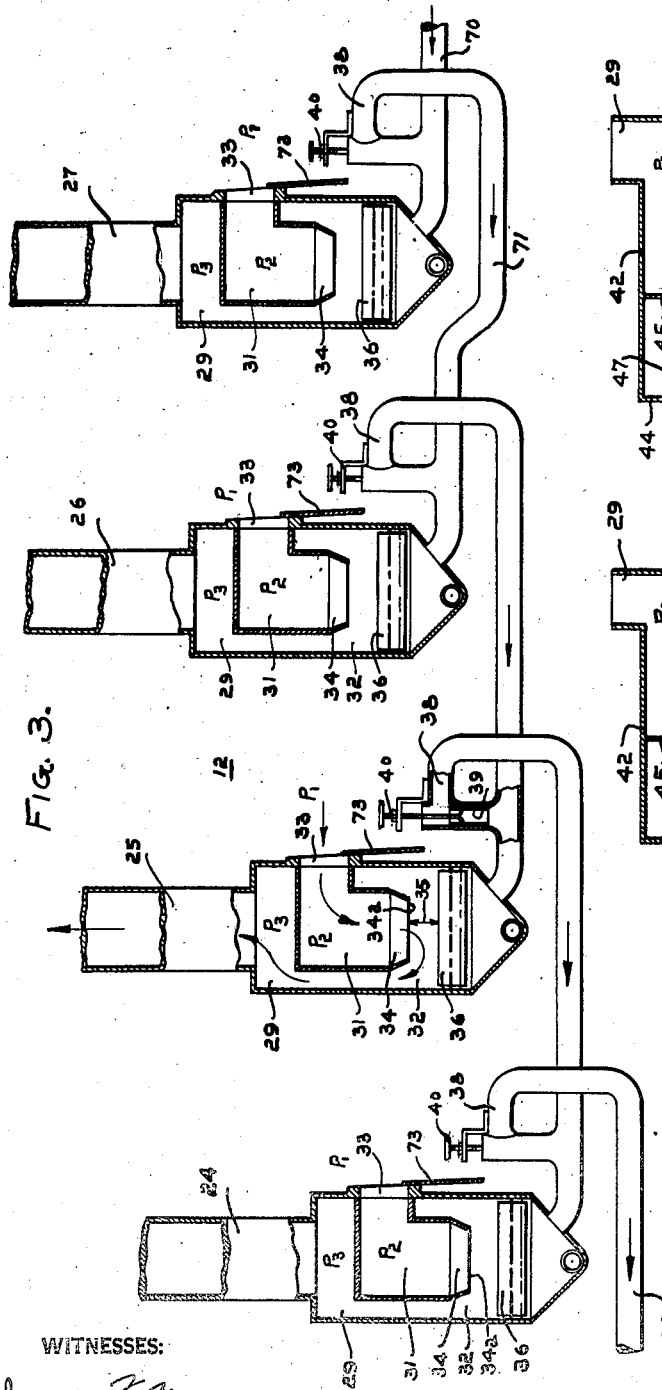
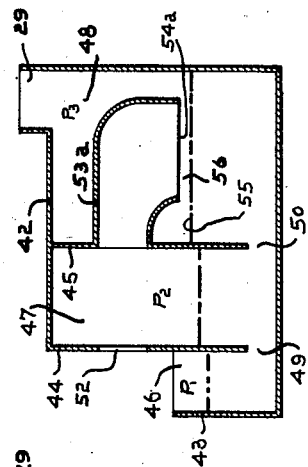
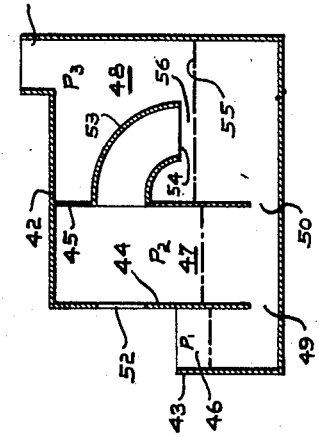

Patented Mar. 7, 1939

2,149,392

UNITED STATES PATENT OFFICE 2,149,392

FLOW CONTROL APPARATUS FOR GASEOUS MEDIA

Robert A. Foresman, Prospect Park, Pa., assignor to Westinghouse Electric & Manufacturing Company, East Pittsburgh, Pa., a corporation of Pennsylvania Application June 10, 1936, Serial No. 84,405

7 Claims. (Cl. 137—78)

My invention relates to gaseous medium distributing devices of the general type disclosed in the joint application of Donald J. Mosshart and myself, Serial No. 87,138, filed June 25, 1936, wherein each device includes an inlet orifice for admitting gaseous medium from a first chamber followed by a throttle defined in part by a liquid level, which is variable in response to change in differential pressure across the orifice incident to change in flow to a second region supplied by the device and occasioned by change in flow resistance of the second region, the apparatus operating to effect restoration of the differential pressure across the orifice and the normal rate of flow through the device to the second region, irrespective of variations in flow resistance thereof.

For example, where the invention is applied to control the flow of air to combustion apparatus, it provides for more regular combustion. If irregularities should develop in the fuel bed, there will be better opportunity for the fuel bed to restore itself to a desired normal or average condition. If a given region of the fuel bed should tend to become too thin, then, in response to the tendency for increased flow of air through the device to that particular region, the device is rendered effective to restrict such tendency; and, if the resistance at the particular region should assume a value above normal, due, for example, to increased fuel bed thickness, then the tendency for the flow of air through the device to diminish is counteracted, the device tending, under all conditions of operation, to maintain a substantially constant rate of air flow to the end that a more uniform combustion rate may occur throughout the area of the stoker, and the fuel bed to be maintained in a more uniform or average condition in consequence thereof.

In the application aforesaid, the throttle is defined in part by a variable liquid level; and, when the liquid level is used directly for this purpose, particularly as the throttle area becomes relatively small with increase in velocities therethrough, there may be objectionable entrainment of water. Accordingly, in the present application while preserving the arrangement of the orifice and throttle with the throttle area controlled by a variable liquid level, nevertheless the arrangement is such as to avoid entrainment of water incident to passage of air through the throttle. This advantage is due in the main to the provision of a downwardly-directed nozzle for air discharged from the orifice together with means, including the liquid level and cooperating with the discharge end of the nozzle, to provide the throttle. This arrangement minimizes entrainment because of the downward flow of air through and from the nozzle, the reversal of flow incident to passage through the throttle area and the immediately following portion of the device, together with the expansion of the passage area at the discharge side of the throttle, the latter resulting in reduced velocities of air flow and reduced entrainment. Entrainment of water in the air is further minimized due to the presence of a float partially submerged in the liquid and cooperating with the discharge end of the nozzle to provide the throttle. Also, this arrangement provides for forces acting on the float in such a manner that satisfactory operation of the device is secured when the throttle area is restricted. Accordingly, an object of my invention is to provide apparatus having these advantageous features of construction and of operation.

A further object of my invention is to provide a device for controlling the flow of gaseous medium from a first region to a second region of variable flow resistance, the device including an orifice and a throttle between the orifice and the second region, the throttle being defined by a downwardly-directed nozzle for gaseous medium discharged from the orifice and adjustable liquid level means cooperating with the discharge end of the nozzle to provide the throttle.

These and other objects are effected by my invention as will be apparent from the following description and claims taken in connection with the accompanying drawings, forming a part of this application:

Fig. 3 is a diagrammatic view showing the arrangement of devices for a tuyère row together with the constituent features of each device; and Figs. 4 and 5 are diagrammatic views showing modified forms of the invention and illustrative of principles thereof.

Figure 1:
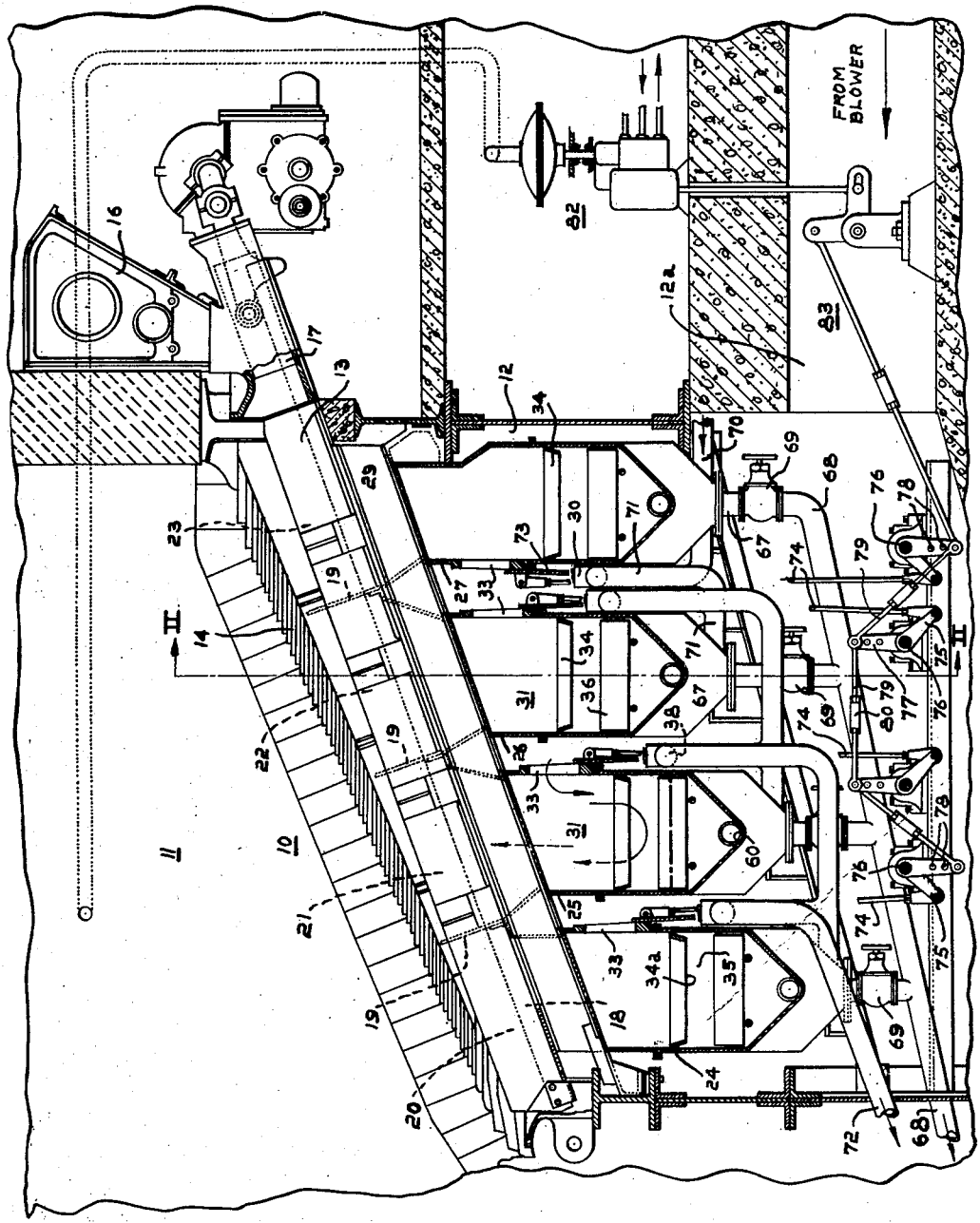
Fig. 1 is a longitudinal sectional view of a stoker having my improved air supply apparatus applied thereto.

Referring to Fig. 1, an underfeed stoker at 10 is shown at the bottom of the combustion chamber 11, a plenum chamber or air box 12 being arranged below the stoker and having an air supply duct 12a.

The stoker includes a plurality of parallel retorts 13 with tuyère rows 14 arranged between adjacent retorts and with side wall tuyères 15 arranged outwardly of the outermost retorts. Each retort 13 is supplied with fuel from the hopper 16 by means of the primary ram 17 in the usual way.

The tuyère rows 14 and the side wall tuyères 15 have air channels 18 arranged therebelow and each air channel is sub-divided by plates 19 into sections 20, 21, 22, and 23 considered in the direction opposed to fuel bed travel, and the sections of each air chamber in the order named are supplied with air from the chamber 12 by the devices 24, 25, 26, and 27, respectively.

Each of the devices 24, 25, 26, and 27 includes a vertically-extending duct construction 29 having means associated therewith to provide first, second, and third compartments, 30, 31, and 32, respectively, the first compartment 30 being in direct and open communication with the interior of the chamber and cooperating with the third compartment 32 to provide a manometric chamber, whose first leg opens into the chamber and whose second leg is within the duct construction 29, and the second compartment 31 being defined by a downwardly-directed nozzle.

Air flows through an inlet orifice 33 from the first region into the secondary compartment 31 defined by a downwardly-directed nozzle construction 34 arranged within the duct construction 29. Means cooperate with the discharge end 34a of the nozzle 34 to provide a throttle 35, the downwardly-moving stream of air, in passing through the throttle, being reversed for passage upwardly in the conduit 29 and about the nozzle 34.

The means cooperating with the discharge end of the nozzle to provide the throttle includes a float 36 partially submerged in liquid of the second leg of the manometric chamber formed by the communicating primary and tertiary compartments 30 and 32. Each manometric chamber has an overflow 38 so that the quantity of liquid may be predetermined and maintained. Preferably, the overflows 38 are vertically adjustable; and, to this end, I show, for example, a vertically adjustable sleeve 39 movable by suitable means 40.

From the apparatus so far described, it will be apparent that air from the first region enters the duct construction through the orifice 33 of each device and passes downwardly through the nozzle 34 from which it is discharged through the throttle 35 into the tertiary chamber 32 for passage upwardly through the duct construction 29, the nozzle being sufficiently smaller than the duct construction to permit of upward flow of air thereby. Due to the disposition of the float 36 in the second leg of the manometric chamber, this is, in the tertiary compartment 32, and partially submerged in the body of liquid in such chamber, it will be obvious that the float 36 is responsive to a change in flow rate through the device to vary the throttle area so as to restore the flow rate to its normal value. If the region of the fuel bed supplied by a device changes, then immediately a change in rate of flow of air through the device is induced; however, such change in rate of flow involves changes in the various pressures encountered in connection with the device. Assuming that the first region pressure is at primary pressure $P_1$, that the orifice 33 is supplied with air at that pressure and effects reduction thereof to a pressure $P_2$ in the secondary compartment 31, and that the throttle effects a further pressure reduction from $P_2$ to a tertiary pressure $P_3$, then the effect of a change in fuel bed resistance is to cause variation of the area of the throttle in such a direction as to compensate for the variation in fuel bed resistance, whereby a substantially constant rate of air flow is maintained through the device irrespective of the variation in fuel bed resistance at the region supplied by the device.

If there is a change in fuel bed resistance at the supplied region, then the tertiary pressure $P_3$ and the secondary pressure $P_2$ will both change, such that, with the primary pressure $P_1$, the forces due to such pressures, as well as the dynamic reaction incident to turning of the stream of air passing through the throttle, all cooperate to effect a change in liquid level and position of the float 36, such that the area of the throttle is changed to compensate for the change in fuel bed resistance. If the fuel bed resistance should decrease, then the float is operated upon to diminish the throttle flow area and vice versa.

Thus, it will be seen that the float 36 and the manometric body of liquid supporting it comprise the lower and movable element of the throttle 35, such element being inherently capable of providing a force acting in opposition to the force of the pressure at the inlet side of the orifice, whereby the movable element may be moved by the various forces acting thereon to different positions to restore approximately the rate of flow of air through the device in case of variation in fuel bed resistance. With the float in equilibrium, the forces thereon are the upwardly-acting lift force of the water, it being remembered that the float is positioned primarily by the extent of rise or fall of the manometric leg of water sustaining it, the downwardly-acting static secondary pressure $P_2$ and the impact of the air stream passing through the throttle area from the secondary to the tertiary pressure regions, such impact being a function of $P_2$ minus $P_3$. Aside from the manner of response of the manometric volume of liquid to the various pressures, resulting in movement of such column, and, therefore, of the float, the effect of the lift of the liquid on the float is, of course, also a function of its shape, that is, its displacement. Furthermore, an additional control of the reactions of each device may be obtained by varying the initial value of the throttle area, this providing an initial pressure differential between secondary and tertiary pressures ($P_2 - P_3$) before the device begins to respond to changes in the rate of air flow. The upward and downward forces acting on the flot 36 are brought into balance by proportioning the displacement of the float and the area of impact and static air pressure. Once the forces are balanced, the lower movable throttle element, comprising the liquid and the float, functions to maintain a substantially constant rate of air flow through the device irrespective of changes in fuel bed resistance of the region or area supplied thereby. In general, the lower movable throttle element has liquid-sealed pressure abutment faces subject to pressures at the inlet and exit sides of the orifice, such pressures providing opposed forces acting on the element to afford movement thereof and to vary the throttle area, and the throttle area is inherently capable of providing a gravity force which, with the force due to the pressure at the exit side of the orifice, balances the force due to the pressure at the inlet side of the orifice; and, while these are the main forces acting in opposition to effect equilibrium of the movable element, nevertheless, there may be other forces exerting an effect on the movable element, such forces being that due to the tertiary pressure and the impact force. While the second leg of the manometric liquid body is subject both to secondary and tertiary pressure forces acting in opposition to the primary pressure force, relatively small throttle areas may be satisfactorily employed because of the downward direction of flow of air to the throttle together with the impact effect of the reversing air stream passing through the throttle, these effects preventing erratic operation of the throttle when providing very small flow areas, since the arrangement is such that the various changes cannot come into play to effect undesired closure of the throttle; and, in addition, the directions of flow, the relative areas of passages and the float cooperate to avoid liquid entrainment.

Figure 2:
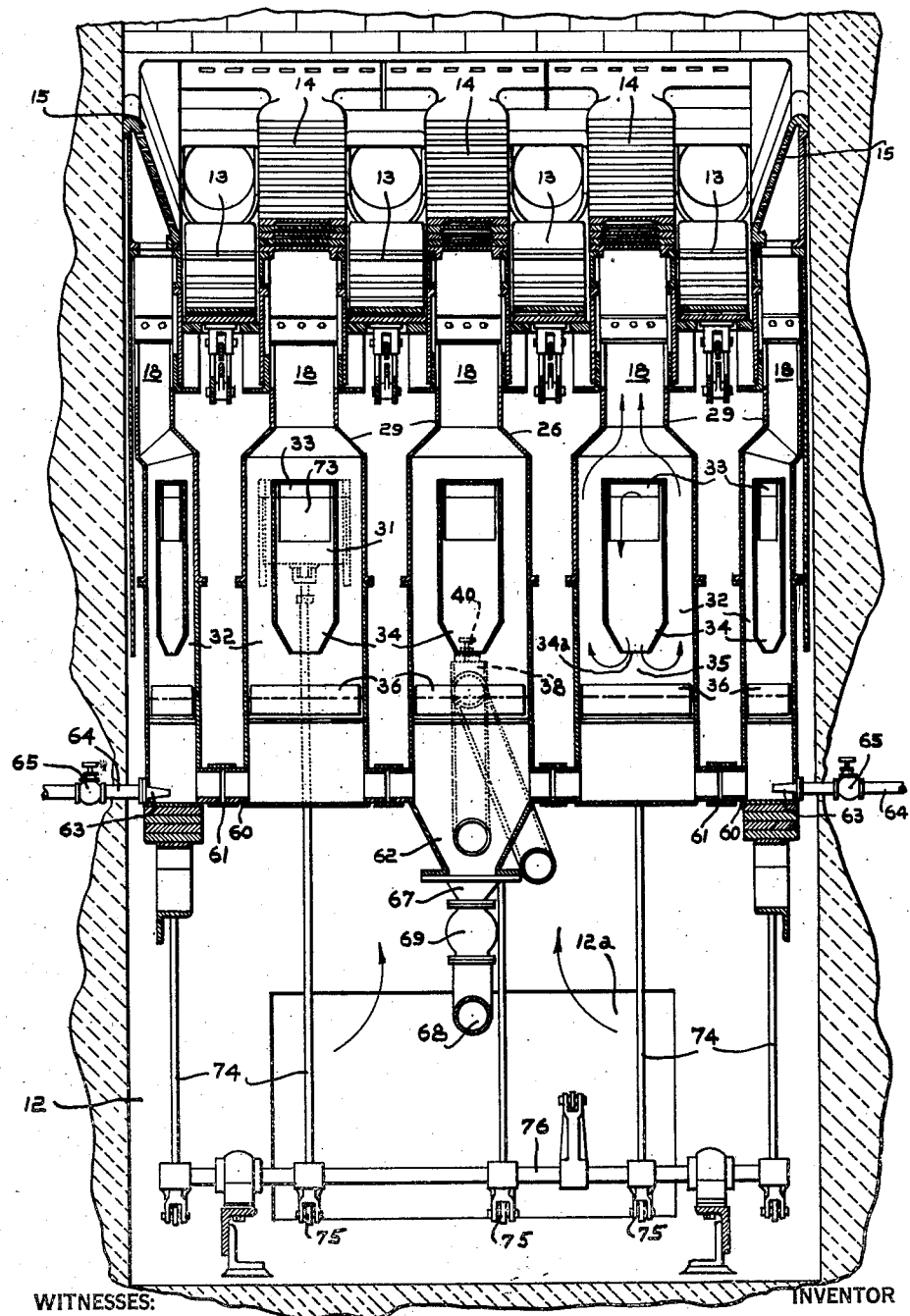
Fig. 2 is a section taken along the line II—II of Fig. 1.

The principle of the apparatus so far described may perhaps be somewhat clearer upon reference to diagrammatic Figs. 4 and 5. In these views, there is shown diagrammatically a duct construction 29 for the purpose of supplying air to a group of tuyères, the duct construction including an inlet structure 42 having vertical walls 43, 44, and 45 providing first, second, and third compartments 46, 47, and 48, respectively, the compartments communicating at their bottoms by means of openings 49 and 50 to provide a manometric chamber having legs for the compartments. The first compartment 46 is in free and open communication with the first plenum region 12, so that liquid therein is subjected to primary pressure $P_1$. An orifice 52 provides for flow of air from the first region, at primary pressure $P_1$, to the secondary compartment 47, such orifice effecting a pressure reduction from primary pressure $P_1$ to the secondary pressure $P_2$. From the secondary compartment 47, air flows through the downwardly-directed nozzle 53 having a downwardly-directed discharge end 54 in the tertiary compartment 48, the level of liquid 55 in the tertiary compartment cooperating with the discharge end 54 of the nozzle to provide a throttle 56. Due to the different pressures effective in the compartments, it will be apparent that the levels of liquid therein will be different, the level in secondary compartment 47 will be somewhat higher than the primary compartment 46 because of the pressure drop $P_1-P_2$ across the primary orifice 52, and the level in tertiary compartment 48 will be somewhat higher than the secondary compartment 47 because of the pressure drop $P_1-P_3$. From these diagrammatic views, as well as features of construction already described in connection with Figs. 1, 2, and 3, it will be seen that entrainment of water by the air passing through the throttle is minimized for a number of reasons. First of all, air is downwardly-directed and has to be reversed for upward flow through the conduit 29 and the discharge velocity from the throttle is reduced because of the expanded nature of the tertiary chamber relatively to the nozzle.

In Fig. 5, I show a diagrammatic arrangement similar in all respects to Fig. 4, except that the nozzle 53a has been changed to provide a widened and narrowed discharge end 54a, this feature being even further conducive to minimizing entrainment of water.

As will be evident from a consideration of Figs. 3, 4, and 5, aside from the advantage of avoiding entrainment, it will be apparent that the downward direction of flow of air supplied to the throttle is advantageous in that closure of the throttle cannot occur when the area thereof is very largely restricted.

Referring back to Figs. 1, 2, and 3, and to the matter of water entrainment, the float 36 further minimizes entrainment in that such float directly cooperates with the discharge end 34a of the nozzle to provide the throttle.

Each tuyère row is shown as being provided with four air supply devices 24, 25, 26, and 27. Accordingly, for the plurality of rows of tuyères 10 and the side wall tuyères, there will be a transverse group of devices 27 at the front of the stoker and at the highest level, a second transverse group 26, at a somewhat lower level, a third transverse group 25 at a still lower level, and a fourth transverse group 24 at the lowest level. This arrangement of devices facilitates the maintenance of the water therein as well as cleaning thereof.

With respect to cleaning of the devices, as disclosed and claimed in the application of Mosshart, Serial No. 85,861, filed June 18, 1936, the devices are connected at the bottom by means of nipples 60 and couplings 61, the devices 29 all being of the same height except the intermediate one which extends downwardly to provide a hopper 62. The nipples 60 of each transverse group are alined so that water jets 63 associated with the outermost devices 29 may be disposed so as to direct streams of water from opposite sides through the nipples and into the hopper 62. The jets are provided with water supply pipes 64 having valves 65.

The hoppers 62 of the intermediate devices of the transverse groups are connected by vertical drain branches 67 to the drain conduit 68, the branches having valves 69. Normally, the valves 69 are closed so as to maintain the desired level of water in the various compartments.

When it is desired to clean out the compartments because of material particles sifting thereinto from the stoker, the valves 69 are opened so as to connect the drain conduit 68 with the compartments and the jets 63 are rendered effective to flush out the compartments toward the central hoppers 62 connected to the drain.

It is necessary to provide means for maintaining water in the desired amounts in the several manometric chambers. To this end, the first legs of the latter are provided with the overflows 38, as already pointed out, and means cooperates with the manometric chambers for replenishing the various manometric chambers of the devices with water to make up for losses due to leakage and evaporation, the overflows being adjustable so as to provide for initial adjustment of the throttle. Accordingly, I show the overflows arranged so as to discharge water in cascade formation from the devices at the highest level and through the remaining devices at successively lower levels, any excess being discharged from the devices at the lowest level. Water is supplied by the conduit 70 to the uppermost transverse row of devices 27, any excess of water, as determined by the overflows 38 for such devices, passing by means of conduits 71 to the group of devices 26. In like manner, overflow from the latter devices passes to the row of devices 25 and from the latter to the lowermost devices 24, and the overflows 38 of the latter devices are connected to the drain pipe 72.

While each device operates to maintain a substantially constant uniform pressure drop across its orifice, it is necessary to change the area of the orifice if the rate of flow is to be changed.

Accordingly, each orifice 33 has associated therewith a gate valve 73 for effecting variation thereof, the gate valves being connected to rods 74 whose lower ends are pivotally connected to cranks 75 carried by the crank shafts 76, the crank shaft also being provided with cranks 77 having openings 78 therein arranged at different radial distances from the axis of the crank shaft. The several crank shafts are inter-connected by adjustable links 79 whose ends are arranged to be pivotally associated with any of the openings 78, each rod including a turnbuckle or the like 80 so that its length may be appropriately varied. Thus, by proper selection of the openings 78 with which the ends of the links are to be associated and choice of link lengths, not only may the gate valves 73 all be adjusted in like manner and to a similar extent, but relative variations may be effected.

The inter-connected crank shaft and link mechanism may be operated in any suitable manner. For example, I show an automatic combustion control mechanism 82 of a conventional type which is connected by linkage at 83 to the first crank shaft 76. If a change in load should occur, requiring an increased rating, then the device 82 responds and operates the various gate valves 73 in such a way as to increase the air flow rates through the various devices. If the load should diminish, the contrary operation would occur.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In apparatus for controlling the flow of gaseous medium from a first region maintained under suitable pressure to a second region of variable flow resistance, a duct construction for discharging gaseous medium into the second region, an orifice for admitting gaseous medium from the first region to the duct construction, a throttle having its flow area in the flow path of the duct construction between the orifice and the second region, said throttle including a downwardly-directed nozzle supplied with gaseous medium from the orifice and means for maintaining liquid at a level below the discharge end of the nozzle to provide a throttle area, and means responsive to change in flow rate through the orifice pursuant to change in flow resistance of said second region to vary the liquid level of the throttle so as to change the throttle area in a direction to compensate substantially for the change in flow resistance of the second region and to minimize change in orifice flow rate.

2. In apparatus for controlling the flow of gaseous medium from a first region maintained under suitable pressure to a second region of variable flow resistance, a duct construction for discharging gaseous medium into the second region; an orifice for admitting gaseous medium from the first region to the duct construction; a throttle having its flow area in the flow path of the duct construction between the orifice and the second region; said throttle including a downwardly-directed nozzle supplied with gaseous medium from the orifice, means for maintaining a liquid at a level below the discharge end of the nozzle, and a float supported by the liquid and having its upper surface cooperating with the discharge end of the nozzle to provide an annular throttle area; and means responsive to change in flow across the orifice to adjust the liquid level so as to minimize the extent of orifice flow rate change.

3. In apparatus for controlling the flow of gaseous medium from a first region maintained under suitable pressure to a second region of variable flow resistance, a duct construction for discharging gaseous medium into the second region, an orifice for admitting gaseous medium from the first region to the duct construction, means for varying the orifice area, a throttle having its flow area in the flow path of the duct construction between the orifice and the second region, said throttle including a downwardly-directed nozzle supplied with gaseous medium from the orifice and means for maintaining liquid at a level below the discharge end of the nozzle to provide a throttle area, and means responsive to change in rate of flow across the orifice to adjust the liquid level to vary the throttle area so as to minimize the extent of said orifice flow rate change.

4. In apparatus for controlling the flow of gaseous medium from a first region maintained under suitable pressure, to a second region of variable flow resistance, a duct construction for discharging gaseous medium into the second region, an orifice for admitting gaseous medium from the first region to the duct construction, a throttle having its flow area in the flow path of the duct construction between the orifice and the second region, said throttle including a downwardly-directed nozzle supplied with gaseous medium from the orifice and means for maintaining liquid at a level below the discharge end of the nozzle to provide an annular throttle area, means for adjusting said liquid level to bring the latter into predetermined relation with respect to the discharge end of the nozzle, and means responsive to change in rate of flow across the orifice to change said liquid level so as to vary the throttle area in such a direction as to minimize the orifice flow rate change.

5. In apparatus for controlling the flow of gaseous medium from a first region maintained under suitable pressure to a second region of variable flow resistance, a duct construction for discharging gaseous medium into the second region; said duct construction including means providing first, second and third compartments and at least said first and third compartments communicating and being arranged to provide a U-shaped space; an orifice for supplying gaseous medium from said first region to the second compartment; a throttle for controlling flow from the second to the third compartment and including an upper and downwardly-directed nozzle for discharging gaseous medium from the second compartment and means including liquid in said U-shaped space and whose level in the third compartment cooperates with the discharge end of the nozzle to provide the throttle area; and means responsive to change in rate of flow across the orifice to change the liquid level and vary the throttle area so as to minimize the orifice flow rate change.

6. In apparatus for controlling the flow of gaseous medium from a first region maintained under suitable pressure to a second region of variable flow resistance, a duct construction for discharging gaseous medium into the second region; said duct construction including means providing first, second and third compartments and at least said first and third compartments communicating and being arranged to provide a U-shaped space; an orifice for supplying gaseous medium from said first region to the second compartment; a throttle for controlling flow from the second to the third compartment and including an upper and downwardly-directed nozzle for discharging gaseous medium from the second compartment and means including liquid in said U-shaped space and whose level in the third compartment cooperates with the discharge end of the nozzle to provide the throttle area; means responsive to change in rate of flow across the orifice to change the liquid level and vary the throttle area in such a direction as to minimize said orifice flow rate change; means for supplying liquid to said U-shaped space; and means providing an overflow from said space at a predetermined height of said first compartment.

7. In apparatus for controlling the flow of gaseous medium from a first region maintained under suitable pressure to a second region of variable flow resistance, a duct construction for discharging gaseous medium into the second region; said duct construction including means providing first, second and third compartments and at least said first and third compartments communicating and being arranged to provide a U-shaped space; an orifice for supplying gaseous medium from said first region to the second compartment; a throttle for controlling flow from the second to the third compartment and including an upper and downwardly-directed nozzle for discharging gaseous medium from the second compartment and means including liquid in said U-shaped space and whose level in the third compartment cooperates with the discharge end of the nozzle to provide the throttle area; means responsive to change in rate of flow across the orifice to change the liquid level and vary the throttle area in such a direction as to minimize the orifice flow rate change; means for supplying liquid to said U-shaped space; an overflow associated with said first compartment and providing for the escape of excess liquid from said space; and means providing for vertical adjustment of said overflow so that the liquid level may be brought into predetermined relation with respect to the discharge end of the nozzle.

ROBERT A. FORESMAN.